S. PEARSON.

Bed-Bottoms.

No. 6,204.

Reissued Jan. 5, 1875.

Witnesses:
H. H. Dodge
W. E. Chaffee

Inventor:
Saml Pearson,
by Dodgeson
Attys.

THE GRAPHIC CO. PHOTO-LITH. 39 & 41 PARK PLACE, N.Y.

UNITED STATES PATENT OFFICE.

SAMUEL PEARSON, OF CINCINNATI, OHIO, ASSIGNOR TO EMANUEL G. GORY.

IMPROVEMENT IN BED-BOTTOMS.

Specification forming part of Letters Patent No. 49,434, dated August 15, 1865; reissue No. 5,604, dated October 14, 1873; reissue No. 6,204, dated January 5, 1875; application filed September 24, 1874.

*To all whom it may concern:*

Be it known that I, SAMUEL PEARSON, of Cincinnati, in the county of Hamilton and State of Ohio, have invented certain new and useful Improvements in Bed-Bottoms; and I do hereby declare that the following is a full, clear, and exact description of the construction and operation of the same, reference being had to the annexed drawings making part of this specification, in which—

Figure 1:
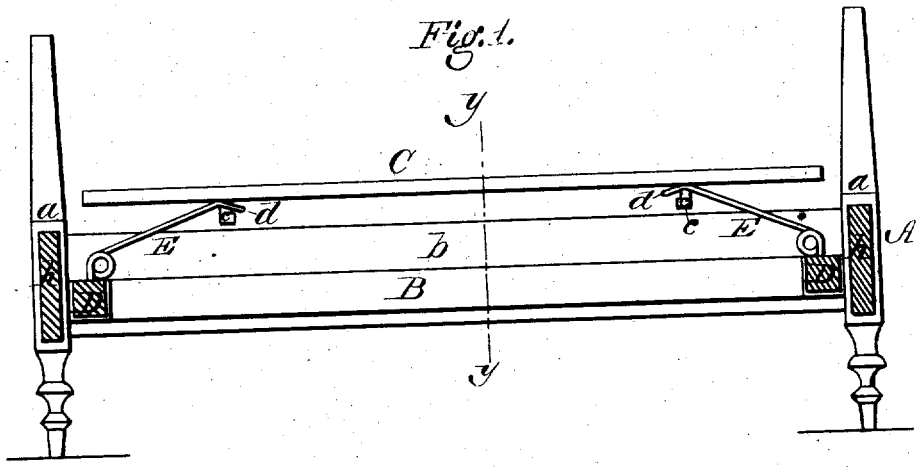
Figure 2:
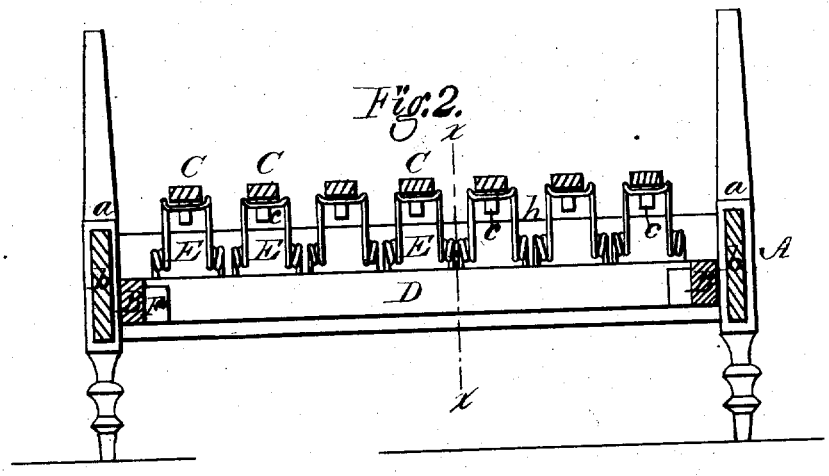
Figure 3:
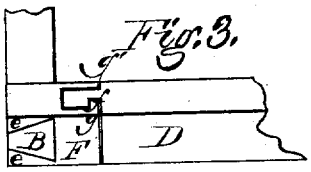
Figure 4:
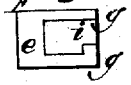

Figure 1 is a longitudinal vertical section of a bed-bottom made according to my invention, together with a like section of a bedstead-frame. Fig. 2 is a transverse vertical section thereof. Fig. 3 is a detached view of one of the corners of the bed-bottom to show the joint. Fig. 4 is a representation of the socket by which the joint is secured.

Similar letters of reference indicate like parts.

This invention has reference to that class of bed-bottoms in which the slats are sustained by springs having double helices; and its objects are, first, to so construct and arrange the springs severally with reference to the slats to be sustained that the slats are made to extend the full length of the bed, and thereby the bedding may be prevented from sagging at the ends; second, to keep each slat firmly in its place, and prevent lateral motion without binding the slats together, which would prevent their separate removability and interfere with the elasticity of the several springs; third, to connect each slat to its sustaining-spring by a device formed independent of the material of the slat; fourth, to so construct such separate connecting-device as that the slat may be removed from the spring and reversed without interfering with the other slats, none of which objects were accomplished in bed-bottoms of this class prior to the date of my invention.

A represents a bedstead-frame, composed of parts *a*, side boards *b*, and end boards *h*, made in the usual manner. It is here shown supporting my bed-bottom, whose frame, made up of the two side rails, B, and two end rails, D, rests upon cleats fixed within the bedstead-frame. The ends of the rails D are square, and are placed against the inner sides, next the ends of the side rails B, in such way as that the ends of the rail B shall be flush with the outer faces of the end rails D. In this position they are secured to each other by means of a double-socket-joint piece, F, of peculiar shape, which is shown separately in Fig. 4 in top view. This joint-piece is most conveniently and cheaply made by casting. The end of the rail B is received in a socket formed by the angular sides *e e*, that portion of the rail which rests therein being formed to a dovetail. The opposite side of the joint-piece F has also a socket, open only on its upper side, its side *g'* being plain, the opposite side, *g*, having a lip, which takes into a vertical groove, *f*, cut on the outer face of the rail D, as shown in Fig. 4. A joint-piece of like construction is placed on each joint of the bed-bottom. The springs which support the slats C are designated by the letter E. They are each formed of one piece of wire, as shown, (or the piece *d* may be a separate piece rigidly fastened to the two sides of the springs,) so that the two sides are connected to make a double-sided spring, whose feet or stationary ends may be appropriately formed and secured in the rails D. Their sides rise on an inclination which takes a direction inward from the rail D. Immediately before the sides of the springs are connected by the cross-pieces *d* they descend somewhat, so that the cross-portions *d* are sufficiently lower than the highest points of the sides of the springs to form heels or bent stirrups, within which the slats may severally lie, the width of the slats being equal to the length of the cross-pieces *d* of the springs. The sides of the springs brace the edges of the slats, and thereby prevent their lateral displacement, as shown in Fig. 1. The most economical and convenient mode of using these stirrups is to place them underneath the slats, as shown.

An advantage of great importance flowing from these bent stirrups, or their equivalent, is that they facilitate, in connection with the separate connecting device, the use of thinner, and therefore more elastic, material in the slats.

There being no obstruction between the helices of each spring, the slats C may be of a length equal to that of the bed-bottom. Each slat has a pin, *c*, inserted through it near each end. These pins are slotted transversely on their inner sides, as seen in Fig. 1, and, as shown, their length is twice the thickness of the slat, plus the vertical length of the slot. Their area in cross-section will depend upon their form in such section somewhat, but more upon the character of the material from which such pins or attachments may be made. The slots receive the cross-portions of the springs, and thereby securely fasten each slat to its springs, the tension of the springs causing their cross-portion to draw constantly against the pin *c*, and thus keep the slats securely connected with the pins when the springs are not pressed down by a weight on the slats, and when such weight is removed from the slat the notches in the pins will catch and hold the cross-portions of the springs. The slats may be made of any suitable number and material, and if any of them should become sprung or bent from long continued use, they can be turned over, and the pins be pushed or driven through so as to bring their slots on the opposite sides of the slats, the slot being made in the middle of the length of the pins for this purpose.

My slats are severally removed, when desired, by depressing a spring at one end, separately from the slat sustained by such spring, to release the pin or attachment from the spring, and they are replaced in the same manner.

As shown in the drawings, my mode of connecting the described spring to the slat (and which is the best mode in which I have contemplated applying this principle of my invention) consists of cylindrical slotted pins adjustable in the mortise of the slats, and this form answers the purpose of a secure and independent connection of the described springs, severally, with the slats, and in addition affords a convenient mode of reversing the slat, when that is desirable. The use of the independent connecting-pieces for this purpose not only makes a more secure connection than if the spring were attached directly to the slat, but it permits thinner material, having greater elasticity, to be used in the slats, and inserting the pin vertically through the slat is deemed the better mode of applying it, for the reason that when the slat is reversed the projecting portion of the pin is entirely on the under side of the slat, and cannot interfere with the bedding.

Prior to the date of my invention the bent stirrup shown upon my springs, for the purpose of preventing lateral displacement of the slats, were not used for that purpose, and hence spring bed-bottoms having double helical springs then in use, either had all the slats fastened together by a strap, which prevented their reversibility, and interfered with the independent operation of the different springs, as in the case of Whipple's patent, dated October 25, 1859; or notches were cut in the slats for the stirrups to rest in, which necessitated the use of thick or rigid slats; or the slats were rigidly fastened to the springs, and consequently not reversible, as in Tucker's patent, dated July 30, 1855.

Having thus fully described my invention, what I desire to secure by Letters Patent is—

1. The combination of the double helical spring, a slat, C, and an independent connecting device or pin, *c*, substantially as and for the purpose described.

2. The spring E, having double helices with spaces between them, through which a slat the full length of the bed may pass without obstruction, in combination with a slat, C, substantially as and for the purpose described.

3. A bed-bottom in which the slats are disconnected from each other, and sustained by the springs E, having the bent stirrup *d* to prevent lateral displacement of the slat, substantially as described.

4. In combination, a reversible slat, C, spring E, and pin *c*, substantially as and for the purpose described.

SAMUEL PEARSON.

Witnesses:
M. M. OLINN,
GEORGE J. MURRAY.